W. B. Treadwell.

Car Wheel.

No. 541. Reissued Mar. 30, 1858.

THE ECKERT LITHOGRAPHING CO., WASHINGTON, D. C.

UNITED STATES PATENT OFFICE.

WILLIAM B. TREADWELL, OF ALBANY, NEW YORK.

IMPROVEMENT IN RAILROAD-CAR WHEELS.

Specification forming part of Letters Patent No. 6,021, dated January 9, 1849; Reissue No. 541, dated March 30, 1858.

*To all whom it may concern:*

Be it known that I, WILLIAM B. TREADWELL, of Albany, in the State of New York, have invented a certain new and useful Improvement in Cast-Iron Railroad-Car Wheels; and I do hereby declare that the following is a full, clear, and exact description thereof, reference being had to the accompanying drawings, making a part of this specification, in which—

Figure 1:
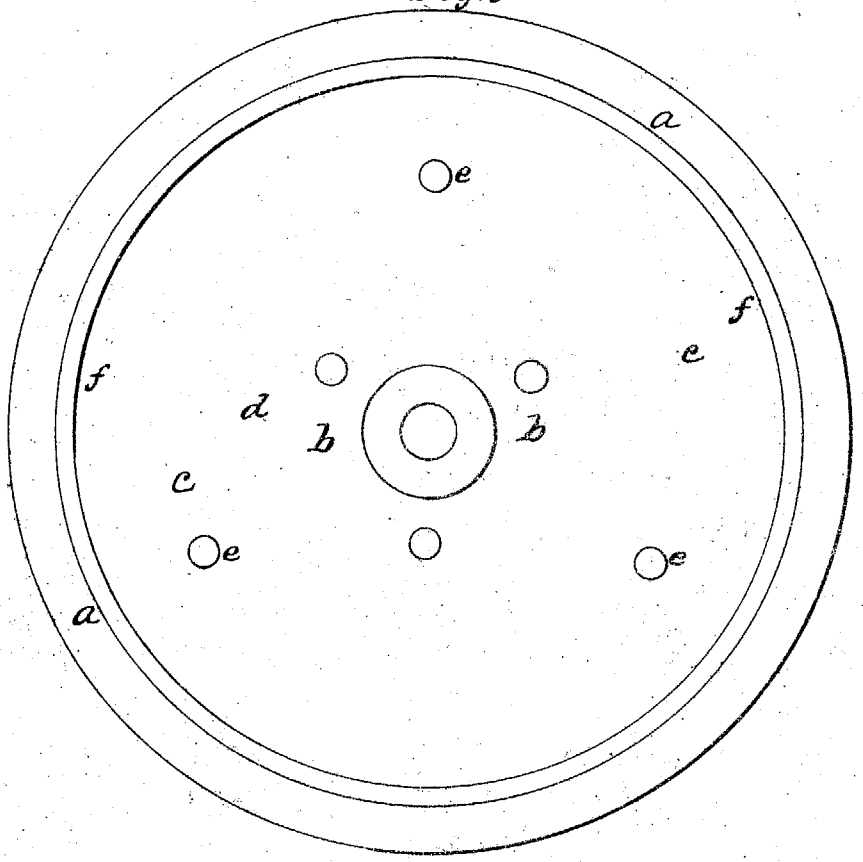
Figure 2:
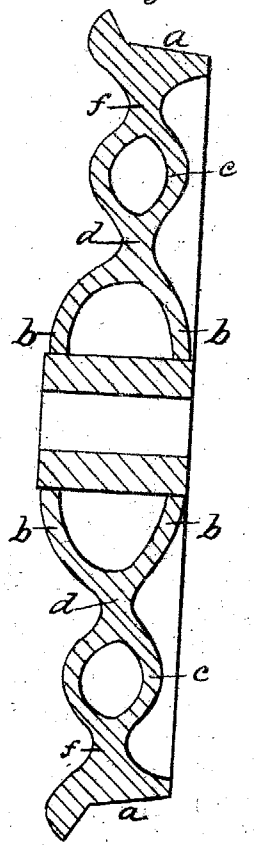

Figure 1 is an elevation of one face of the wheel, and Fig. 2 a section taken in the plane of the axis.

The same letters indicate like parts in the two figures.

My said invention relates to improvements in railroad-wheels which are cast with a chilled rim, and, as in casting such wheels the rim sets and contracts before the inner part, it results that if the said inner part be made in straight lines from the hub to the rim, in contracting after the rim has contracted it must either break or be so seriously strained as to be incapable when cold of resisting the jars, concussions, and vibrations to which railroad car-wheels are subject in use. With the view to avoid this straining and breaking of the metal in casting, such wheels have been cast with two dishing or concavo-convex plates connecting the two edges of the rim with the hub, having a hollow space between the two. This was effectual to a certain extent, for the two plates being curved from the rim to the hub yield to the contraction by simply bending; but in practice such wheels have failed to give satisfaction for various reasons, but mainly on account of their liability to break along that portion of the tread of the rim of the wheel which is opposite to the hollow space between the two plates, that being the part of the tread which rests mainly on the rails, and which is most exposed to wear and to violent concussions when in use. With the view to avoid this defect, and at the same time avail of the important idea of having the metal curved between the hub and the rim to yield by bending to the unequal contraction, prior to my said invention wheels were made hollow around the hub, presenting a form which in a section passing through the wheel in the plane of its axis would represent two plates, starting each from near one end of the hub and curved in opposite directions and uniting in one plate about the middle of the distance between the hub and rim, and thence extending in straight lines to the rim; and this single plate, instead of being bent out of a straight line between the hollow part and the rim, was waved in the direction of the circumference, alternately running in reversed curves from the inner to the outer and from the outer to the inner edge of the rim, with the view to give support to the entire width of the rim. But this was still deficient, as it did not give entire support to that part of the tread of the wheel most exposed to fracture, and in casting exposed that portion of the metal between the rim and the hollow part to be fractured or seriously strained by the unequal contraction in cooling, there being no provision for yielding, by bending, to the unequal contraction along that portion of the wheel which is most exposed to strain in casting and to be broken or otherwise injured by the jars, concussions, and vibrations when in use.

My said invention consists in forming the wheel, which is cast whole with a chilled rim, by connecting the rim with the hub by means of two plates, which are so curved as to form a hollow annulus near to the rim, and which are united into one to constitute a solid ring, forming the connection with the rim at or about the middle of its width; and my said invention also consists in combining with the above the curving of the two said plates so as to unite and form a second solid ring between the said hollow annulus and the hub, and again dividing them into two and curving them outward in opposite directions to connect with the hub at or near the ends thereof, forming a second hollow annulus near to the hub.

By the curvature of the plates between the solid parts and specially near to the rim ample provision is secured for bending to yield to the unequal contraction, such curvatures at the same time securing the required degree of elasticity to prevent serious injury by the vibrations to which railroad-wheels are exposed in use, while at the same time the union of the said plates into a narrow solid ring, forming the connection with the rim at or near the middle of its width, gives ample support and strength to that part of the rim which is most exposed to fracture; and what is also of great importance the metal is so disposed as to present, in addition to the other advantages, such a disposition of the metal as to secure ample strength to resist all the concussions to which wheels are exposed in use.

The formation of my wheel is as follows: The chilled rim or tread and outer flange, *a*, of the wheel and the hub or nave (which hub is one piece, as is shown in Fig. 2) are like those in use prior to my said invention; and the said rim and hub of the wheel are connected together by the following concentric annular parts, starting from near the middle of the inner circumference of the said chilled rim toward the hub—that is to say, first a narrow solid ring of metal, *f*, expanding next into a hollow ring of metal, *c*, the preferable form of which is such that a transverse section thereof would present the shape of two acute or lancet-shaped arches united at their abutments, and their vertices or crowns respectively being in a line from the said middle of the rim to near the middle of the hub, contracting next into another solid ring of metal, *d*, and expanding next between that and the ends of the hub into one-half of another such hollow ring of metal *b*, a transverse section of which would resemble such an arch as aforesaid, its crown joining the last-mentioned solid ring, and its extremities or abutments, respectively connected with the ends of the hub, and inclosing an annular arch-shaped hollow space around the hub, all so arranged as aforesaid that a plane extending from near the middle of the length of the hub to the middle of the length of the said inner circumference of the rim would divide all the said annular parts and their inclosed spaces into two equal parts. I leave three (more or less) holes, *e*, on the inner or flange side of the wheel through the respective hollow rings by which the cores on which they are cast are sustained in the mold and afterward removed in the usual manner of casting with cores.

It is obvious that in large wheels two or more hollow annular tubes like the one shown in the drawings and marked *c* can be added, and that the shape of the hollow rings may be varied without materially affecting the principle or usefulness of the invention.

The hub may with advantage be placed, as exhibited in Fig. 2, a little more toward the inner or flange side than the outer side of the wheel, with a slight variation in shape of the connecting parts to meet this arrangement.

From the foregoing it will be obvious that one part of my said invention may be employed to advantage without the other by substituting for the inner one of the two solid rings and the inner hollow annulus or ring some other mode of connecting with the hub the plates which form the hollow annulus or ring nearest the rim; but the best results will be obtained by the use of both parts of my said invention in connection.

What I claim as my invention, and desire to secure by Letters Patent in railroad-wheels to be cast in one piece with a chilled rim, is—

1. The forming of such wheels with a hollow concentric annulus or ring, the plates forming a curve, substantially as specified, to yield, by bending, to the unequal contraction, in combination with the connection thereof with the rim at or near the middle of its width, by means of the solid ring, substantially as described, to give the required support to that part of the rim which is most exposed to fracture in use, as set forth.

2. In combination with the hollow annulus or ring connected with the rim by a solid ring, substantially as described, the inner hollow annulus or ring next to and connected with the hub, substantially as described, and connected with another hollow annulus or ring by a solid ring, substantially as described, whereby ample provision for yielding to the unequal contraction is obtained, while at the same time the metal composing the wheel is so disposed as to prevent in a great measure the injurious effects of vibrations, and to resist the jars and concussions to which railroad-wheels are exposed in use.

WM. B. TREADWELL.

Witnesses:

ANDREW DICKEY,
RICHD. M. ROOD.